2,864,255

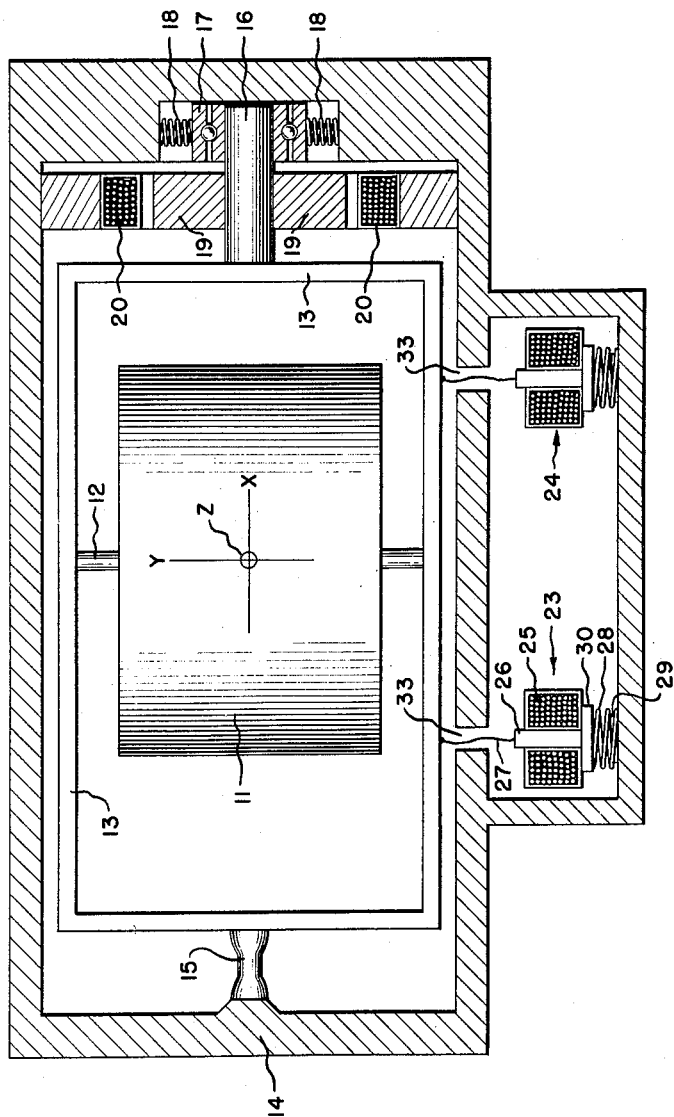

SELF TESTING RATE GYROSCOPE

Howard H. Stern, La Jolla, and Ivan W. Keith, San Diego, Calif., assignors to General Dynamics Corporation, San Diego, Calif., a corporation of Delaware Application October 4, 1957, Serial No. 688,153

9 Claims. (Cl. 74—5.4)

This invention relates to a self testing rate gyroscope and more particularly to a rate gyro having a device which, when activated, applies a torque about the gyro rotor or gimbal input axis which effects a gyro output signal.

The systems utilizing gyros are innumerable and the failure or malfunction of a gyro is generally quite serious. Thus, the gyros in a system should be thoroughly tested to determine whether or not they are operating properly. There are many gyro systems in which it is desirable to know whether or not the gyro spin motors or rotors are running and if so, whether or not they are running at the correct speed. At present, missiles and rockets are launched without this test being made. The same problem exists in aircraft and other vehicles.

The present invention is a rate gyro having a torquer for applying a torque about the input axis, enabling a check to be made of all the functions of the gyro which would affect output reading for a given input. This torquer is not a re-zeroing, drift or other correction or return device. The torquer may be enclosed either within the gyro case itself or within a housing attached to the gyro case.

An object of the present invention is to provide a rate gyro having a torquer for applying a torque about the gimbal or rotor input axis.

Other objects and features of the present invention will be readily apparent to those skilled in the art from the following specification and appended drawings wherein is illustrated a preferred form of the invention, and in which:

Figure 1 is a schematic of a rate gyro with torqueing devices.

The gyroscope illustrated in Figure 1 utilizes two torqueing devices to achieve relative positive and negative torque inputs. Quite often, when a gyro is incorporated in a system it is fixed to a "platform" or "stable table" or the like. Formerly, gyroscopes had no means for applying a torque or torques about the gimbal input axis. This meant that after the platform or stable table was installed in a vehicle then it was no longer possible to make a satisfactory gyro test. The present invention overcomes that disadvantage.

Referring to Figure 1, the "Y" axis shown is the gyro rotor spin axis, and the "X" axis is the gyro output axis. The gyro rotor 11 spins about the "Y" axis or spin axis while supported by the shaft 12 and gimbal 13. The gimbal is attached to the case 14 on one end by the torsion bar 15 while the other end of the gimbal is supported by the freely rotatable shaft 16 and bearings 17. The bearing 17 is supported by springs 18 that allow the bearing to move slightly in a direction parallel to the spin axis. A conventional pick-off core 19 and coils 20 are used to detect movement of the gimbal about the output or "X" axis. The torquers are generally indicated by arrows 23 and 24. A torquer consists of a solenoid coil 25 and movable core 26. The core 26 is formed from a paramagnetic material and is attached to the gimbal by wire 27. A flange 30 attached to the core and a spring 28 keep the core positioned until the coil is energized. (The flange may be of any material.) When the coil is energized, the stop 29 limits the distance the core may travel.

To test the functioning of the gyro, a current is applied to one of the solenoid coils 25. This causes the solenoid core 26 to move rapidly until the flange 30 contacts the stop 29. This motion imparts a force to the gimbal through wire 27 and produces a torque about the input ("Z") axis of the gyro rotor 11. This input torque causes the gyro rotor and attached gimbal to rotate about the output ("X") axis. The movement about the output axis is detected by the pick-off which transforms the movement into a suitable signal. The apertures 33 must be large enough to permit the wires 27 to move with the gimbal as it rotates slightly about the output axis.

A slight amount of bearing motion parallel to the spin axis "Y" is required in order to simulate an input and cause precession of the gyro rotor. This is accomplished by having the bearings spring mounted. The spring constant of the bearing mount is very high, making the natural frequency of this part of the gyro much higher then the basic gyro natural frequency. By mechanically limiting the travel of the solenoid core, the same amount of torque is applied about the input axis each time current is applied to the solenoid coil. Accordingly, the pick-off output signal should be the same each time. A change in the output signal indicates something is wrong with the gyro. Since the same amount of torque is applied each time the solenoid is energized, the torquer could also be used to calibrate the gyroscope from time to time.

The torqueing devices are not limited to moving core solenoids since numerous equivalents will perform the same function. The torquers could be electrohydraulic, pneumatic, mechanical or other in nature. The linkage between a torquer and the gimbal is not restricted to a wire and it is conceivable that gyros could be designed in which the linkage would not be required at all. The separation of the torquers from the main body of the gyroscope is not mandatory and they are so located in the preferred embodiment merely to minimize any undesirable effects due to the magnetic induction fields of the solenoids.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A self testing rate gyroscope comprising a casing, a gimbal within said casing, a torsion bar connected between said gimbal and said casing, a shaft connected to said gimbal and supported by a bearing, said shaft and said torsion bar forming an output axis about which said gimbal can rotate, a power driven rotor supported in said gimbal and having a spin axis perpendicular to and intersecting said output axis, said rotor and gimbal being arranged to rotate about said output axis in response to torques applied about an input axis of said rotor and gimbal, said input axis being perpendicular to and intersecting said spin axis and said output axis, a pick-off within said casing for producing an output signal in accordance with rotation of said gimbal, and means within said gyroscope for applying a torque about said input axis to produce rotation of said gimbal about said output axis whereby the operation of the gyroscope may be tested.

2. A self testing rate gyroscope comprising a casing, a gimbal within said casing, a torsion bar connected between said gimbal and said casing, a shaft connected to said gimbal and supported by a bearing, said shaft and said torsion bar forming an output axis about which said gimbal can rotate, a power driven rotor supported in said gimbal and having a spin axis perpendicular to and intersecting said output axis, said rotor and gimbal being arranged to rotate about said output axis in response to torques applied about an input axis of said rotor and gimbal, said input axis being perpendicular to and intersecting said spin axis and said output axis, a pick-off within said casing for producing an output signal in accordance with rotation of said gimbal, and means connected to said gimbal for applying a torque about said input axis to produce rotation of said gimbal about said output axis whereby the operation of the gyroscope may be tested.

3. A self testing rate gyroscope comprising a casing, a gimbal within said casing, a torsion bar connected between said gimbal and said casing, a shaft connected to said gimbal, a spring mounted bearing for supporting said shaft, said shaft and said torsion bar forming an output axis about which said gimbal can rotate, a power driven rotor supported in said gimbal and having a spin axis perpendicular to and intersecting said output axis, said rotor and gimbal being arranged to rotate about said output axis in response to torques applied about an input axis of said rotor and gimbal, said input axis being perpendicular to and intersecting said spin axis and said output axis, a pick-off within said casing for producing an output signal in accordance with rotation of said gimbal, and means connected to said gimbal for applying a torque about said input axis to produce rotation of said gimbal about said output axis whereby the operation of the gyroscope may be tested.

4. A self testing rate gyroscope comprising a casing, a gimbal within said casing, a torsion bar connected between said gimbal and said casing, a shaft connected to said gimbal, a bearing for supporting said shaft, springs for holding said bearing in position, said shaft and said torsion bar forming an output axis about which said gimbal can rotate, a power driven rotor supported in said gimbal and having a spin axis perpendicular to and intersecting said output axis, said rotor and gimbal being arranged to rotate about said output axis in response to torques applied about an input axis of said rotor and gimbal, said input axis being perpendicular to and intersecting said spin axis and said output axis, a pick-off within said casing for producing an output signal in accordance with rotation of said gimbal, a torquer, and means for connecting said torquer to said gimbal, said torquer transmitting a torque to said gimbal thru said connecting means, said torque being applied to said gimbal about said input axis for producing rotation of said gimbal about said output axis whereby the operation of the gyroscope may be tested.

5. A self testing rate gyroscope comprising a casing, a gimbal within said casing, a torsion bar connected between said gimbal and said casing, a shaft connected to said gimbal, a bearing for supporting said shaft, springs for holding said bearing in position, said shaft and said torsion bar forming an output axis about which said gimbal can rotate, a power driven rotor supported in said gimbal and having a spin axis perpendicular to and intersecting said output axis, said bearing springs allowing bearing motion parallel to said spin axis, said rotor and gimbal being arranged to rotate about said output axis in response to torques applied about an input axis of said rotor and gimbal, said input axis being perpendicular to and intersecting said spin axis and said output axis, a pick-off within said casing for producing an output signal in accordance with rotation of said gimbal, a torquer, and a wire for connecting said torquer to said gimbal, said torquer applying a torque to said gimbal thru said wire, said torque being applied to said gimbal about said input axis for producing rotation of said gimbal about said output axis whereby the operation of the gyroscope may be tested.

6. A self testing rate gyroscope comprising a casing, a gimbal within said casing, a torsion bar connected between said gimbal and said casing, a shaft connected to said gimbal, a bearing for supporting said shaft, springs for holding said bearing in position, said shaft and said torsion bar forming an output axis about which said gimbal can rotate, a power driven rotor supported in said gimbal and having a spin axis perpendicular to and intersecting said output axis, said bearing springs allowing bearing motion parallel to said spin axis, said rotor and gimbal being arranged to rotate about said output axis in response to torques applied about an input axis of said rotor and gimbal, said input axis being perpendicular to and intersecting said spin axis and said output axis, a pick-off within said casing for producing an output signal in accordance with rotation of said gimbal, a torquer, a solenoid having a core which moves when said solenoid is energized, said movement being limited by mechanical stops, and a wire connecting said core to said gimbal, said core movement applying a torque to said gimbal thru said wire, said torque being applied to said gimbal about said input axis for producing rotation of said gimbal about said output axis whereby the operation of the gyroscope may be tested.

7. A self testing rate gyroscope comprising a casing, a gimbal within said casing, a torsion bar connected between said gimbal and said casing, a shaft connected to said gimbal and supported by a bearing, said shaft and said torsion bar forming an output axis about which said gimbal can rotate, a power driven rotor supported in said gimbal and having a spin axis perpendicular to and intersecting said output axis, said rotor and gimbal being arranged to rotate about said output axis in response to torques applied about an input axis of said rotor and gimbal, said input axis being perpendicular to and intersecting said spin axis and said output axis, a pick-off within said casing for producing an output signal in accordance with rotation of said gimbal, and means within said gyroscope for applying relative positive and negative torques about said input axis to produce rotation of said gimbal about said output axis whereby the operation of the gyroscope may be tested.

8. A self testing rate gyroscope comprising a casing, a gimbal within said casing, a torsion bar connected between said gimbal and said casing, a shaft connected to said gimbal, a bearing for supporting said shaft, springs for holding said bearing in position, said shaft and said torsion bar forming an output axis about which said gimbal can rotate, a power driven rotor supported in said gimbal and having a spin axis perpendicular to and intersecting said output axis, said rotor and gimbal being arranged to rotate about said output axis in response to torques applied about an input axis of said rotor and gimbal, said input axis being perpendicular to and intersecting said spin axis and said output axis, a pick-off within said casing for producing an output signal in accordance with rotation of said gimbal, two torquers, and means for connecting said torquers to said gimbal, said torquers transmitting relative positive and negative torques to said gimbal thru said connecting means, said torques being applied to said gimbal about said input axis for producing rotation of said gimbal about said output axis whereby the operation of the gyroscope may be tested.

9. A self testing rate gyroscope comprising a casing, a gimbal within said casing, a torsion bar connected between said gimbal and said casing, a shaft connected to said gimbal, a bearing for supporting said shaft, springs for holding said bearing in position, said shaft and said torsion bar forming an output axis about which said gimbal can rotate, a power driven rotor supported in said gimbal and having a spin axis perpendicular to and intersecting said output axis, said bearing springs allowing bearing motion parallel to said spin axis, said rotor and gimbal being arranged to rotate about said output axis in response to torques applied about an input axis of said rotor and gimbal, said input axis being perpendicular to and intersecting said spin axis and said output axis, a pick-off within said casing for producing an output signal in accordance with rotation of said gimbal, two solenoids having cores which move when said solenoids are energized, said movement being limited by mechanical stops, each core being connected to said gimbal by a wire, movement of one said core applying a positive torque to said gimbal thru said wire, movement of the other said core applying a negative torque to said gimbal thru said wire, said torques being applied to said gimbal about said input axis for producing rotation of said gimbal about said output axis whereby the operation of the gyroscope may be tested.

References Cited in the file of this patent

UNITED STATES PATENTS

| | | |
|---|---|---|
| 2,669,126 | Simmons et al. | Feb. 16, 1954 |
| 2,800,024 | Lear et al. | July 23, 1957 |
| 2,805,577 | Shomphe | Sept. 10, 1957 |